United States Patent
Eiselt

(10) Patent No.: US 7,835,645 B2
(45) Date of Patent: Nov. 16, 2010

(54) OPTICAL CIRCUIT STRUCTURE FOR REALIZING A HIGHER-ORDER NODE IN AN OPTICAL TRANSMISSION NETWORK

(75) Inventor: Michael Eiselt, Kirchheim (DE)

(73) Assignee: ADVA AG Optical Networking, Meiningen (DE)

( * ) Notice: Subject to any disclaimer, the term of this patent is extended or adjusted under 35 U.S.C. 154(b) by 740 days.

(21) Appl. No.: 11/676,992

(22) Filed: Feb. 20, 2007

(65) Prior Publication Data
US 2007/0196106 A1    Aug. 23, 2007

(30) Foreign Application Priority Data
Feb. 21, 2006   (DE) .................... 10 2006 008 404

(51) Int. Cl.
H04J 14/00   (2006.01)
H04J 14/02   (2006.01)
(52) U.S. Cl. ............................. 398/83; 398/50; 398/79; 398/82
(58) Field of Classification Search ............ 398/83, 398/50
See application file for complete search history.

(56) References Cited

U.S. PATENT DOCUMENTS

| 6,538,784 | B1* | 3/2003 | Lee et al. ........................ 398/82 |
| 7,356,259 | B1* | 4/2008 | Haggans ......................... 398/83 |
| 2003/0138252 | A1* | 7/2003 | Paiam et al. ................... 398/49 |
| 2003/0169961 | A1 | 9/2003 | Bortolini |
| 2004/0208548 | A1* | 10/2004 | Gruber et al. .................. 398/50 |
| 2005/0276605 | A1* | 12/2005 | Pain et al. ...................... 398/79 |
| 2006/0062577 | A1* | 3/2006 | Miura et al. ................... 398/82 |

FOREIGN PATENT DOCUMENTS

WO    WO 2006/005191 A1    1/2006

* cited by examiner

*Primary Examiner*—Ken N Vanderpuye
*Assistant Examiner*—Oommen Jacob
(74) *Attorney, Agent, or Firm*—The Culbertson Group, P.C.

(57) ABSTRACT

The invention relates to an optical circuit structure for realizing a higher-order node in an optical transmission network with a number N of bidirectional remote ports, wherein an optical receive wavelength division multiplexed signal with a set of optical receive channels can be fed to each remote port and wherein an optical transmit wavelength division multiplexed signal with a set of optical transmit channels can be output from each remote. The optical drop channel means and the optical add and cross-connect means include exclusively optical splitter units, optical demultiplexing units, and optical add units, wherein for generating each transmit wavelength division multiplexed signal for a certain remote port, the receive wavelength division multiplexed signals of several or all of the other remote ports are guided as cross-connect wavelength division multiplexed signals toward the certain remote port. Depending on the number of cross-connect wavelength division multiplexed signals, one or more sub-transmit wavelength division multiplexed signals for the certain remote port are generated by means of splitter units, add units, and demultiplexing units, and these are finally combined by means of an optical splitter unit into the transmit wavelength division multiplexed signal.

15 Claims, 8 Drawing Sheets

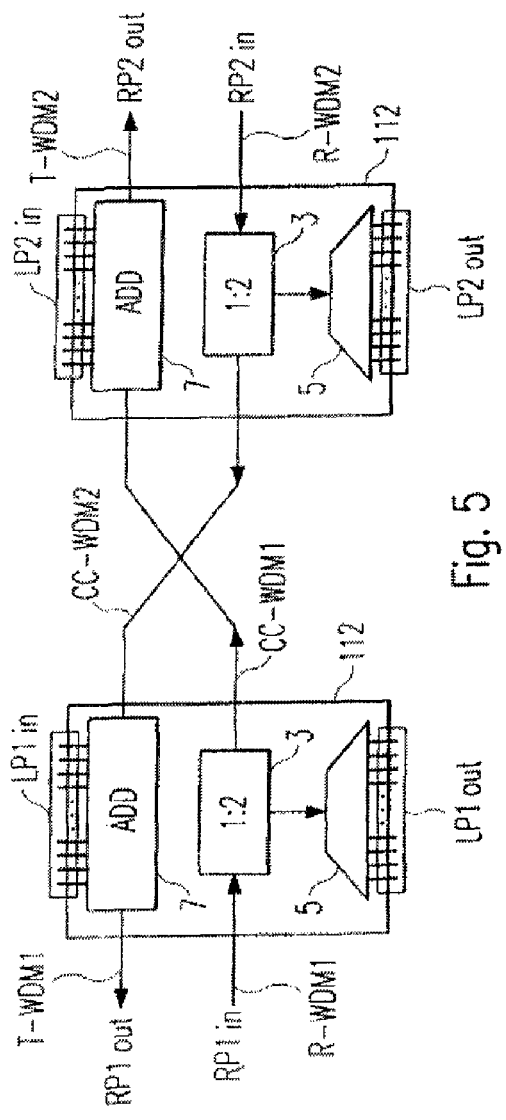
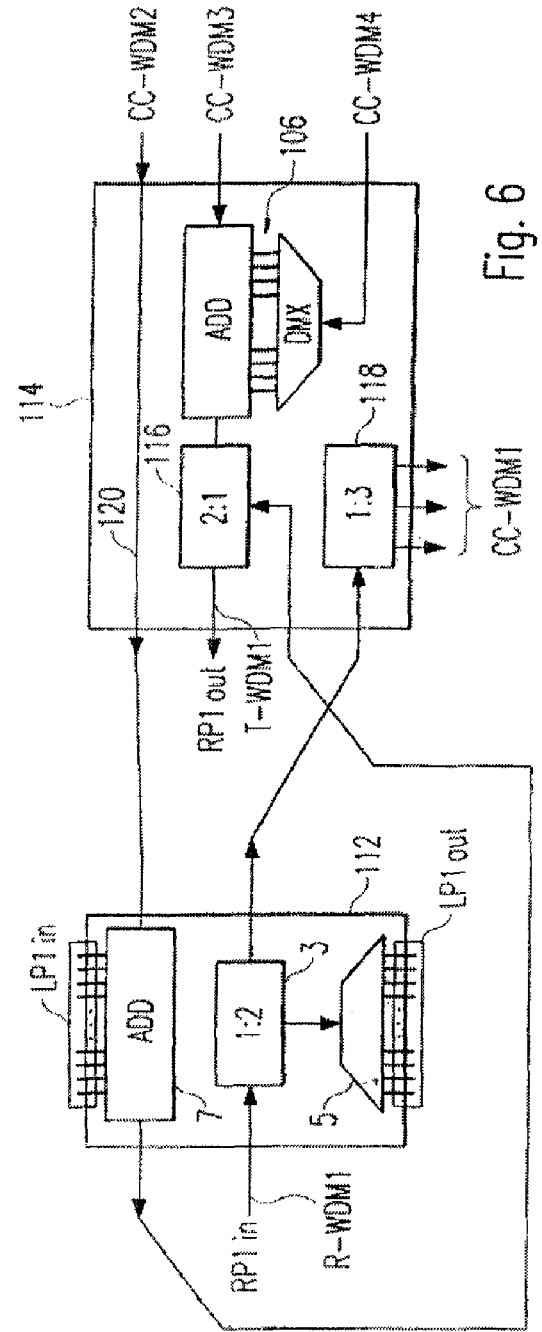

OPTICAL CIRCUIT STRUCTURE FOR REALIZING A HIGHER-ORDER NODE IN AN OPTICAL TRANSMISSION NETWORK

TECHNICAL FIELD OF THE INVENTION

The invention relates to an optical circuit structure for realizing a higher-order node in an optical transmission network for transmitting optical wavelength division multiplexed signals (WDM signals) as well as to an optical expansion module for expanding an optical circuit structure for realizing a node of second order or higher. Further, the invention relates to an optical circuit structure for realizing an uninterruptible and expandable second-order node for an optical circuit structure.

BACKGROUND OF THE INVENTION

Realization of a second-order node by means of two add units and two 1:2 splitter units as drop units is known. Corresponding structures are shown in FIGS. 1b and 1a, respectively. A drop unit 1 according to FIG. 1a can be realized by means of a 1:2 splitter unit 3 and a demultiplexing unit 5. The receive WDM signal (R-WDM) received by a remote port is fed to this drop unit. Because the splitter unit 3 generates WDM signals, which correspond to the R-WDM signal and have only a small optical power, at the output port, it is possible to realize a broadcast function, i.e., a channel CH1 to CHn can be dropped in the node and also transmitted simultaneously at another port. The signals of the individual channels are applied to the channel output ports of the demultiplexing unit 5 and can be processed further. The channel output ports here together form the output part LPout of the bidirectional local port LP and guide the (local-transmit) signals supplied from the local-port LP.

The add unit 7 shown in FIG. 1b is composed of a demultiplexing unit 9, a number of optical 2×1 switches 11 and variable optical attenuators 13 corresponding to the number of channels of the relevant WDM signal, as well as an optical multiplexing unit 15.

A cross-connect WDM signal (CC-WDM) fed to the add unit 7 at the input port 7a is fed to the input port 9a of the demultiplexing unit 9, which generates the signals of the individual channels at the demultiplexer channel output port. The demultiplexer channel output ports are each connected to one input port of a 2×1 switch 11. Each of the other input ports of the 2×1 switches 11 is connected to one local port or to a number of ports corresponding to the number of channels, to each of which the signal of an individual channel can be fed directly and which together form the input part LPin of the bidirectional local port LP (local receive, i.e., the signals fed to the local port).

Using the (preferably controllable) 2×1 switch, the circuit can select whether a certain channel of the CC-WDM signal or a relevant channel of the local port is output via the output port of the switch 11 to the variable attenuators 13 and fed via these elements to the channel input port of the multiplexing unit 15. The optical power carried in the respective individual channel signals can be held within a given range by means of the attenuators 13. For this purpose, the optical power carried in the channels is detected by means of detectors (not shown) and the attenuators are each controlled so that the channel signal power at each output of the attenuators lies in a given range. A transmit-WDM signal (or a sub-transmit-WDM signal), which for each channel CH1 to CHn can contain selectively either the channel signal of the CC-WDM signal or the relevant channel signal fed to the local port LP, can be supplied to the output port 15a of the multiplexing unit 15, which is connected to the output port 7b of the add unit.

Obviously, the demultiplexing unit 5 can be left out or contained in a downstream unit, if the split R-WDM signal can be fed directly to this unit. The local port LPout then guides a WDM signal. Analogous to this situation, a demultiplexing unit (not shown), which demultiplexes a local-receive WDM signal fed to the input port of the multiplexing unit into the individual channels, is provided at the local port LP of the add unit 7. Such a local-receive WDM signal can be delivered, for example, from a channel card that carries a number of tunable transmit elements whose output signals are combined to form a WDM signal.

FIG. 2 shows a schematic of an optical circuit structure for a second-order node that has two remote ports RP1 and RP2 which are composed of the logical sub-ports "RP1in" and "RP1out" and "RP2in" and "RP2out", respectively. In practical optical networks, either a separate optical waveguide can be used for each transmission direction or only one optical waveguide is used, which is then bidirectional.

The circuit structure shown in FIG. 2 for each remote port RP1 and RP2 is composed of a 1:2 splitter unit 3 and an add unit 7, as well as a unit 17 for demultiplexing each split receive WDM signal R-WDM1 and R-WDM2, respectively, into the individual channels CH1 to CHn and for the further processing of the actual channels to be dropped. The demultiplexing unit 5 integrated in FIG. 1 into the drop unit 1 is contained in the unit 17 in the embodiment according to FIG. 2.

In addition, the circuit structure according to FIG. 2 includes for each remote port RP1, RP2 a transmit unit 19, which generates the signals of each channel CH1 to CHn to be integrated into the transmit WDM signal T-WDM1 or T-WDM2 to be supplied from the relevant remote port RP1, RP2. An optical amplifier 21 is also provided on the input and output of each sub-remote port RP1in, RP1out and RP2 in, RP2out, in order to first amplify the incoming signals and to compensate for the losses for the transmitted signals in the circuit structure of the node.

Sub-structures for realizing higher-order nodes for complex optical networks, so-called wavelength selective switches (WSS), have been developed in recent years. A WSS here is composed of several equal-access input ports, to each of which a demultiplexing unit is connected downstream. The demultiplexing outputs for the individual channels (to each of which is allocated a given center wavelength and a certain bandwidth) are each fed to one input port of an optical N×1 switch, with the number of switches corresponding to the number of channels of the WDM system to be realized. The switches each switch a channel of a certain input port of the WSS through to an output port of each switch. The output ports of the switches are connected to the input ports of a multiplexing unit, so that a WDM signal which contains channels of a certain input port in a given way is output at the output port of the multiplexing unit. A node of order N can thus be realized with N WSS, which are connected in a certain way to N optical 1:N splitter units.

An N-order node here has N remote ports, to each of which is fed a receive wavelength division multiplexed signal R-WDM and from each of which can be output a transmit wavelength division multiplexed signal T-WDM. A node with full cross-connect capability allows the extraction of an arbitrary channel of a receive WDM signal fed to an arbitrary remote port and the integration of this channel into the transmit WDM signal of another arbitrary remote port.

In addition, an N-order node typically has N local ports, with each local port being associated with a certain remote port. In this case, it is possible to supply each desired channel of the receive WDM signal of the associated remote port to the local port and to terminate the traffic relation realized by means of this channel in the node. In the same way, an arbitrary channel can also be fed to each local port, wherein this channel is then integrated into the transmit WDM signal of the associated remote port.

The WSS described briefly above, however, involves a relatively new technique, which has not yet been accepted without hesitation by all users, especially operators of large networks.

SUMMARY OF THE INVENTION

Provided herein are optical circuit structures for realizing higher-order nodes in an optical transmission network for transmitting optical WDM signals, which avoid the use of WSS and can be realized simply and cost-effectively. In addition, a simple and flexible expansion of the structure to a higher-order node or a reduction of the structure to a lower-order node is provided. In addition, an optical expansion module for simple expansion of an optical circuit structure for a node of second order or higher to a circuit structure for a higher-order node is provided.

Some embodiments provide an optical circuit structure for realizing an N-order node with a number of N bidirectional remote ports, to each of which is fed an optical receive WDM signal and from each of which an optical transmit WDM signal can be output. This may be realized exclusively through the suitable connection of add units, demultiplexing units, and splitter units.

For the reason of simpler nomenclature, in the scope of the present description a splitter unit, which is actually used for dividing an optical signal into several identical signals, each of lower power, with a certain splitting ratio, is designated as a 1:n splitter unit, and a unit that is operated in the reverse direction and thus combines several optical signals through a simple addition of the optical powers (obviously allowing for losses) to form a single signal is designated as a n:1 splitter unit.

A transmit WDM signal that can be output from a certain remote port is assembled according to some embodiments from several optical cross-connect WDM signals, where in addition the signals of optionally existing add channels are added that are fed to a local port with which the relevant remote port is associated. The transmit WDM signal to be generated is assembled for each remote port, independent of the number of cross-connect wavelength division multiplexed signals, from one or more sub-transmit WDM signals, each of which is generated according to one of the following alternatives:

(i) Every two cross-connect wavelength division multiplexed signals are combined by means of a combination of an add unit and a demultiplexing unit to form a sub-transmit wavelength division multiplexed signal, with one of the cross-connect wavelength division multiplexed signals being fed to the input port of the add unit and the other cross-connect wavelength division multiplexed signal being fed to the input of the demultiplexing unit, wherein the channels generated on the output side by the demultiplexing unit are each fed to a second input port of the 2×1 switch;

(ii) One cross-connect wavelength division multiplexed signal and the optionally existing add channels are combined by means of an add unit to form one sub-transmit wavelength division multiplexed signal;

(iii) A single cross-connect wavelength division multiplexed signal is converted by means of an add unit into a sub-transmit wavelength division multiplexed signal, wherein the individual channels are in this case either switched through or blocked only by the 2×1 switch of the add unit.

The optionally required combination of several sub-transmit WDM signals with the transmit WDM signal that can be output by the relevant remote port happens by means of an optical n:1 splitter unit, with n designating the number of sub-transmit WDM signals to be combined. Combining several sub-transmit WDM signals can be eliminated if only two cross-connect WDM signals are to be combined to form a transmit WDM signal and no receive channels of a local port are to be added (i.e., when the relevant remote port is associated with no local port).

According to one embodiment of the invention, the optical add units each have an identical structure, with the number and spectral position of the channels of the demultiplexing units composed of add units being identical. The number of channels can be equal to, for example, 32.

According to one preferred embodiment of the invention, the receive WDM signals of all of the other remote ports are supplied to a certain remote port as cross-connect WDM signals for generating the transmit wavelength division multiplexed signal for the relevant remote port. In this way, a node with complete cross-connect capability is realized.

According to one embodiment of the invention, the N−1 cross-connection wavelength division multiplexed signals are generated by means of N optical 1:(N−1) splitter units, to each of which the receive WDM signal of a remote port is fed. Each 1:(N−1) splitter unit can obviously be compounded cascade-like from splitter units of lower order, for example, from 1:2 splitter units.

According to one preferred embodiment of the invention, the number M of local ports is equal to the number N of remote ports. In this way, for a node realized in such a manner, add channels can be added to each transmit WDM signal that can be output by a remote port and drop channels can be extracted from each receive WDM signal fed to a remote port and fed to the relevant local port.

For a node realized in this way, the N−1 cross-connect WDM signals can be realized by means of N optical 1:N splitter units, to each of which is fed the receive WDM signal of a remote port, with one of the N split signals being fed to the relevant local port.

The receive WDM signal of the associated remote port fed to a local port can here be demultiplexed by means of a wavelength division demultiplexing unit into the individual drop channels.

According to one embodiment of the invention, the optical splitter unit for combining several sub-transmit WDM signals can be constructed cascade-like from several optical splitter units of lower order, preferably from optical 2:1 splitter units.

The optical expansion module according to the invention for expanding an optical circuit structure for realizing a node of second order or higher allows the expansion of a node of second order or higher, whose structure is based on an optical circuit structure for realizing the node of second order, which has for each of the two remote ports an optical base module composed of a 1:2 splitter unit for generating the drop channels and the cross-connect WDM signal from the receive WDM signal of the relevant remote port for the other remote port, and also an add unit to which are fed the add channels for the relevant remote port and the cross-connect WDM signal and which generates from this signal the transmit WDM signal for the relevant remote port. The expansion module has a combination of an add unit and a demultiplexing unit for generating the transmit WDM signal or a sub-transmit WDM signal, with a first of the cross-connect WDM signals being fed to the input port of the add unit and a second of the cross-connect WDM signals being supplied to the input of the demultiplexing unit, wherein the signals of the add channels generated on the output side by the demultiplexing unit are each fed to a second input port of the 2×1 switch. The expansion module is further composed of an optical 2:1 splitter unit, with one input port of the splitter unit being connected to the output port of the add unit. Finally, the expansion module is also composed of an optical 1:3 splitter unit for generating the cross-connect WDM signals and the signal that can be fed to the relevant local port.

By using such an expansion module, a second-order node with the previously described structure can be easily expanded to a third or fourth-order node that has the following structure:

For each of the three or four remote ports, an optical base module and an optical expansion module with the previously described structure are provided. For generating the transmit WDM signal for each remote port, a first cross-connect WDM signal and optionally the add channels of the relevant local port are fed to the add unit of the base module. In addition, a second cross-connect WDM signal is fed to the input port of the add unit or the input port of the demultiplexing unit of the expansion module. In the case of realizing a fourth-order node, a third cross-connect WDM signal is fed to the input port of the demultiplexing unit or to the input port of the add unit of the expansion module. Finally, the output port of the add unit of the base module is connected to an input port of the 2:1 splitter unit of the expansion module, with the transmit WDM signal for the relevant remote port being applied to the output port of the 2:1 splitter unit. The output port of the 1:2 splitter unit of the base module is connected to the input port of the 1:3 splitter unit of the expansion module. The cross-connect WDM signals generated at the output ports of the 1:3 splitter unit of the expansion module are each guided toward the other remote port.

By using optical expansion modules according to the invention, such a structure of a third or fourth-order node can be expanded easily into an optical circuit structure for a fifth or sixth-order node that has the following structure:

For creating the one or two additional remote ports, the previously described circuit structure for a fourth-order node is expanded by one base module and one expansion module for each additional remote port, with the structure for each remote port corresponding to the structure for each remote port of the previously described circuit structure for a fourth-order node.

The circuit structure expanded in this way is expanded by a second expansion module for each remote port. For generating the transmit WDM signal for each remote port at the output port of the 2:1 splitter unit of the second expansion module, the output port of the 2:1 splitter unit of the first expansion module is connected to the input port of the 2:1 splitter unit of the second expansion module, with the transmit WDM signal of the previously described structure for a third or fourth-order node accordingly being used as a sub-transmit WDM signal. Simultaneously, a fourth cross-connect WDM signal is fed to the input port of the add unit or to the input port of the demultiplexing unit of the second expansion module. In the case of realizing a sixth-order node, a fifth cross-connect WDM signal is fed to the input port of the demultiplexing unit or to the input port of the add unit of the second expansion module. In addition, an output port of the 1:3 splitter unit of the first expansion module is connected to the input port of the 1:3 splitter unit of the expansion module. Finally, the cross-connect WDM signal generated at each of the other two output ports of the 1:3 splitter unit of the first expansion module and at the three output ports of the 1:3 splitter unit of the second expansion module is guided toward the other remote ports.

Such an optical circuit structure for a sixth-order node can in turn be easily expanded, using optical expansion modules according to the invention, into an optical circuit structure for a node of order six plus 2n, with n being a whole natural number. Here the previously described structure for a sixth-order node is expanded for each additional remote port (i.e., for each additional order) by a base module and two expansion modules, with the structure for each remote port corresponding to the previously described structure for each remote port of the sixth-order node. In addition, this structure is expanded for each remote port for each 2n additional remote ports (i.e., for each increase by 2n of the order) by an additional expansion module. For each remote port, every two successive expansion modules are connected analogously to the connection of the first and second expansion modules of the previously described structure for a sixth-order node, with the transmit WDM signal for each remote port being generated in a corresponding way at the output port of the 2:1 splitter unit of the last-added expansion module.

According to some embodiments of the invention, an optical base circuit structure for realizing an uninterruptible and expandable second-order node for an optical circuit structure can be composed of the following components:

(i) An optical add unit, whose output port is connected to a first input port of a 2:1 splitter unit, with the second input port of the 2:1 splitter unit remaining unused in the case of realizing a second-order node and with the transmit WDM signal of the relevant port being generated at the output port of the 2:1 splitter unit from the add channels optionally fed to the add unit and the cross-connect WDM signal fed to the input port of the add unit;

(ii) A 1:2 splitter unit, to which the receive WDM signal of the respective remote port is supplied in each case with the drop channels being output at an output port of the 1:2 splitter unit; and (iii) A 1:m splitter unit whose input port is connected to the other output port of the 1:2 splitter unit, with m being a natural number greater than or equal to two and with the cross-connect WDM signal being generated at the output ports of the 1:m splitter unit for feeding to other remote ports.

A second-order node can be realized so that such an optical base circuit structure is provided for each of the two remote ports and so that each cross-connect WDM signal generated at an output port of the 1:m splitter unit of one base circuit structure is fed to the input port of the add unit of the other base circuit structure.

This circuit structure for a second-order node can be expanded to a third or fourth-order node in such a manner that a previously described base circuit structure is added for each additional remote port, with the cross-connect wavelength division multiplexed signal generated at an output of the 1:m splitter unit of one of the other base circuit structures being fed to each add unit of an added base circuit structure, and such that for each remote port an expansion circuit structure is added composed of another add unit that is combined with a demultiplexing unit, with the demultiplexing output ports of the demultiplexing unit being connected to the input ports of the 2×1 switch of the add unit connected to the free input port of the 2:1 splitter unit, wherein for each remote port, a second or third cross-connect wavelength division multiplexed signal is fed to the input port of the add unit and/or to the input port of the demultiplexing unit of the expansion circuit structure from one of the output ports of the 1:m splitter units of the base circuit structures of the other remote ports.

According to some embodiments of the invention, the previously described circuit structure for realizing a second-order node can be expanded to a node of order N greater than or equal to 5, such that for each additional remote port a base circuit structure is added, with the cross-connect wavelength division multiplexed signal generated at an output of the 1:m splitter unit of one of the other base circuit structures being supplied to each add unit of an added base circuit structure. In addition, for each remote port for each started pair of added remote ports, an expansion circuit structure is added composed of another add unit that is combined with a demultiplexing unit, such that the demultiplexing output ports of the demultiplexing unit are connected to the input ports of the 2×1 switch of the add unit connected to the free input port of the 2:1 splitter unit. Finally, for each of the remote ports, an n:1 splitter unit is added, with the number n designating the number of started pairs of added remote ports. For each remote port, all of the output ports of the add units of the added expansion circuit structures are connected to the input ports 1:n splitter unit. In addition, for each remote port, the output port of the 1:n splitter unit is fed to the input port of the 2:1 splitter unit of the base circuit structure. One of the cross-connect wavelength division multiplexed signals of the other remote ports is fed to the input ports of the add units and the demultiplexing units. Finally, for each remote port for generating the cross-connect wavelength division multiplexed signal for each of the other remote ports, the 1:m splitter unit of the relevant base circuit structure is expanded, if necessary, into a 1:(N−1) splitter unit.

Here, the 1:m splitter unit of the base circuit structure can be constructed, for example, as a 1:3 splitter unit. Thus, a second-order node can be expanded to a third or fourth-order node without expanding the 1:3 splitter unit. For realizing a higher-order node, the 1:3 splitter unit can be expanded cascade-like, for example, solely by using additional 1:2 splitter units, to a 1:(N−1) splitter unit.

All of the previously described base structures and expansion circuit structures can obviously each be constructed as separate modules or can be an assembly of modules composed of additional components. In this way, existing circuit structures can be expanded into circuit structures for higher-order nodes in a simple and modular way.

These and other advantages and features of the invention will be apparent from the following description of the exemplary embodiments, considered along with the accompanying drawings.

BRIEF DESCRIPTION OF THE DRAWINGS

FIG. 5 is a schematic block diagram of a base circuit structure for realizing a second-order node.

FIG. 6 is a schematic block diagram of a circuit structure according to the invention for realizing a third or fourth-order node, with only the components for one of the three or four remote ports being shown.

DESCRIPTION OF EXEMPLARY EMBODIMENTS

Figure 3:
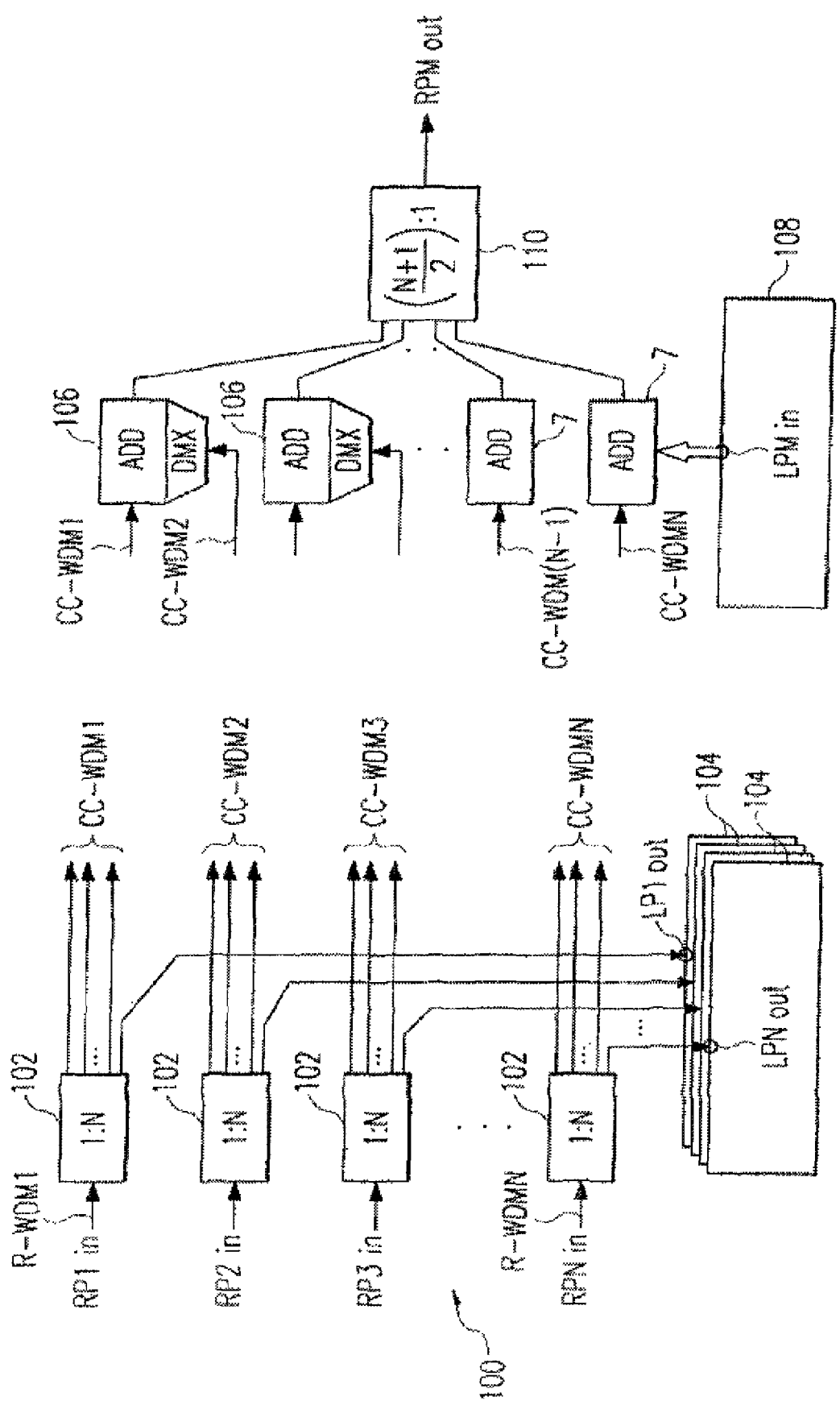
FIG. 3 is a schematic block diagram of a circuit structure according to the invention for realizing an N-order node for an odd number N.

FIG. 3 shows a schematic block diagram of a circuit structure 100 for realizing an N-order node for an odd number N. Here, only the input sides RP1in to RPNin of the remote ports RP1 to RPN are shown. A receive WDM signal R-WDM1 to R-WDMN is fed to each of the remote ports RP1 to RPN. A 1:N splitter unit 102, which splits the receive WDM signal R-WDM1 to R-WDMN fed to it into N individual sub-signals (according to a given division ratio), is connected downstream of each of the remote ports RP1 to RPN, with N−1 of the split sub-signals being guided as cross-connect WDM signals CC-WDM1 to CC-WDMN toward the output sides RP1out to RPNout of the other remote ports RP1 to RPN.

Each of the sub-signals split by means of the splitter units 102 is fed as a receive WDM signal to the output sides LP1out to LPNout of the local ports LP1 to LPN. Because each of the receive WDM signals contains the full information of the receive WDM signals R-WDM1 to R-WDMN respectively fed to remote ports RP1 to RPN, all of the channels that are contained in the receive WDM signals can be dropped in the relevant node. For further processing of the WDM signals fed to the local ports, a unit 104 for further processing of the receive signal fed to each local port is connected downstream of each output side LP1out to LPNout. Further processing can consist of demultiplexing the individual channel signals and selecting the signals to be actually dropped.

At the right in FIG. 3, each circuit structure required for realizing an output side of a remote port RPMout is shown. The cross-connect WDM signals generated at the input sides of each of the other remote ports are fed to the output side RPMout of the remote port RPM, i.e., the output side RPMout of the remote port RPM shown in FIG. 3 obtains all of the cross-connect WDM signals CC-WDM1 to CC-WDMN, but without the cross-connect WDM-signal CC-WDMM.

Figures 1A, 1B:
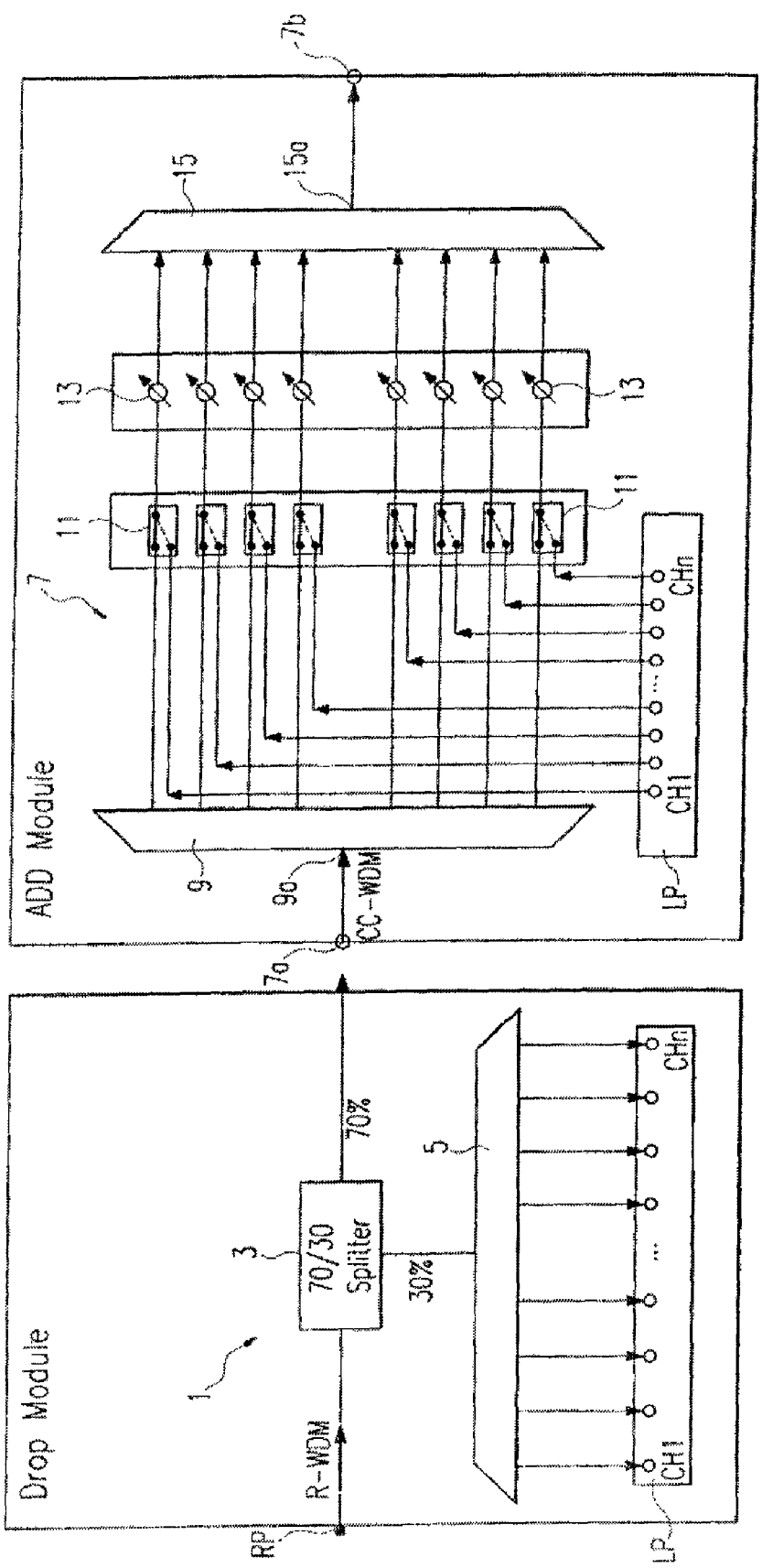
FIG. 1a is a schematic block diagram of a prior art drop unit that may be used to produce circuit structures and modules according to the invention.
FIG. 1b is a schematic block diagram of a prior art add unit that may be used in the circuit structures and modules according to the invention.
Figure 2:
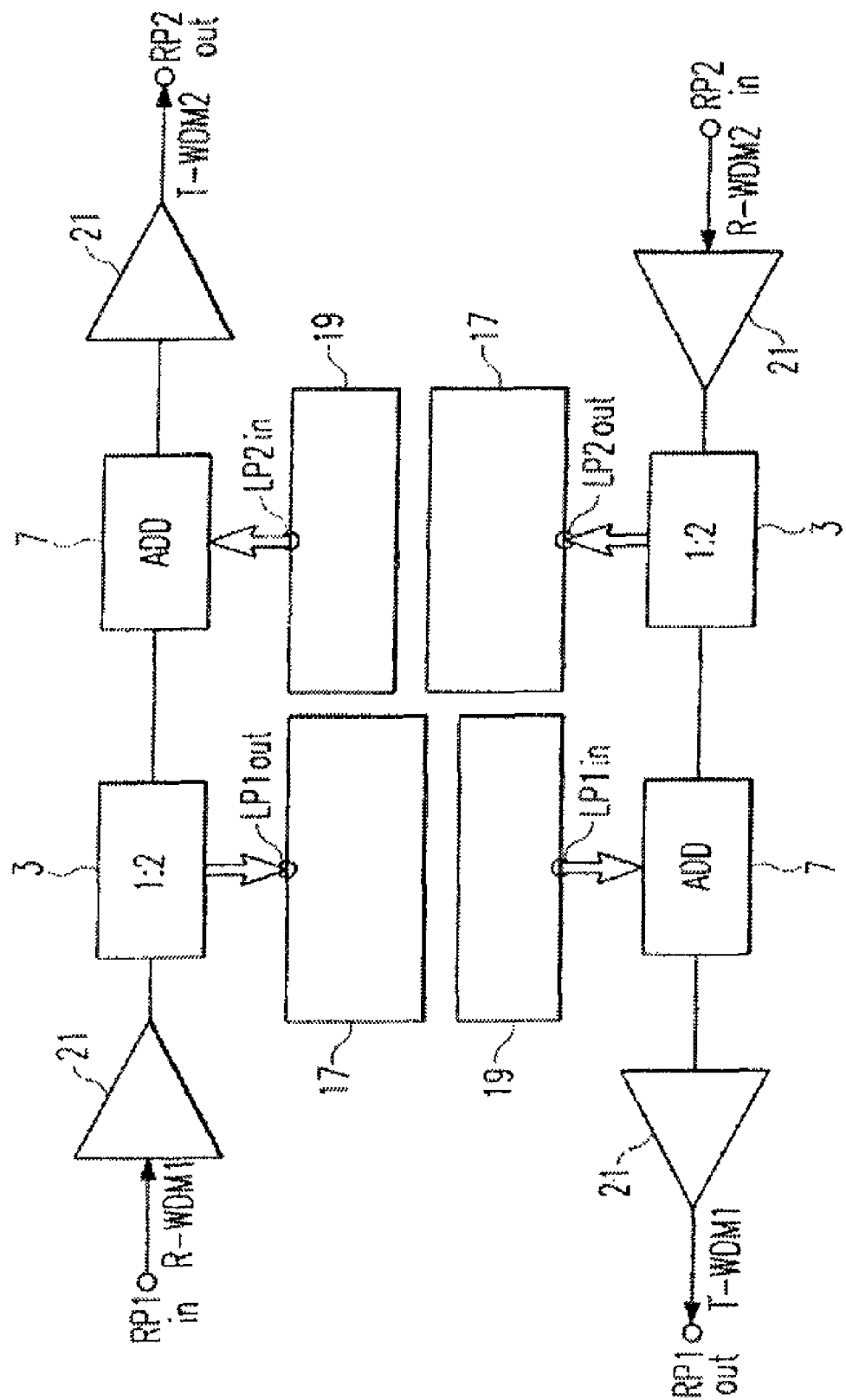
FIG. 2 is a schematic block diagram of a prior art circuit structure for realizing a second-order node.

Every two cross-connect WDM signals are combined into a sub-transmit WDM signal by means of a combined add-demultiplexing unit 106. The add-demultiplexing unit 106 corresponds to an add unit 7 according to FIG. 1b, with the ports for feeding the add channels being connected to the demultiplexing output port of a demultiplexing unit DMX. Thus, if a cross-connect WDM signal is fed to the input port of the demultiplexing unit DMX of the add-demultiplexing unit 106, then this is demultiplexed into the individual channels, with the channels each feeding the 2×1 switches 11 of the add unit 7 shown in FIG. 1b. Consequently, controlling the 2×1 switch 11 allows selecting whether a channel of the cross-connect WDM signal fed to the input port of the add unit or the corresponding channel of the cross-connect WDM signal fed to the input port of the demultiplexing unit DMX is extracted and integrated into the sub-transmit WDM signal generated at the output port of the add-demultiplexing unit 106.

For an odd-numbered number of remote ports, because an even number of cross-connect WDM signals must be combined at the output side of a remote port into the relevant transmit WDM signal and also the add channels to be output in the direction toward the relevant remote port must be integrated into the transmit WDM signal, as shown at the right in FIG. 3, a cross-connect signal can be combined by means of an add unit 7 with the relevant add channels (which are fed as individual channel signals) into a relevant sub-transmit WDM signal. In the structure shown at the right in FIG. 3, the cross-connect WDM signal CC-WDMN is combined with the add channels generated by a unit 108 for each remote port into one sub-transmit WDM signal.

For an odd N-order node, the other remaining individual cross-connect WDM signal can also be guided by means of an individual add unit 7, wherein the add unit 7 is merely used in this case for extracting channels selected by means of the 2×1 switch and for blocking the other channels. For the structure shown at the right in FIG. 3, the cross-connect WDM signal CC-WDM(N−1) is guided as an individual signal via an add unit 7. Obviously, a combined add-demultiplexing unit 106 can also be used instead of the add unit, with the input port of the demultiplexing unit remaining unused. Also, the cross-connect WDM signals CC-WDM(N−1) and CC-WDMN can also be combined by means of an add-demultiplexing unit 106, wherein the add channels in this case are fed via the add unit 7, and the input port of the add unit 7 remains unused for supplying a cross-connect WDM signal.

The sub-transmit WDM signals generated by the add-demultiplexing units 106 and the add units 7 are fed to a splitter unit 110 with a suitable number of input ports. For an odd-numbered N-order node, the number of required input ports for the splitter unit 110 is given by (N+1)/2.

Thus, the transmit WDM signal T-WDM1 to T-WDMN for the relevant remote port RP1 to RPN is generated at the output port of the splitter unit 110.

Figure 4:
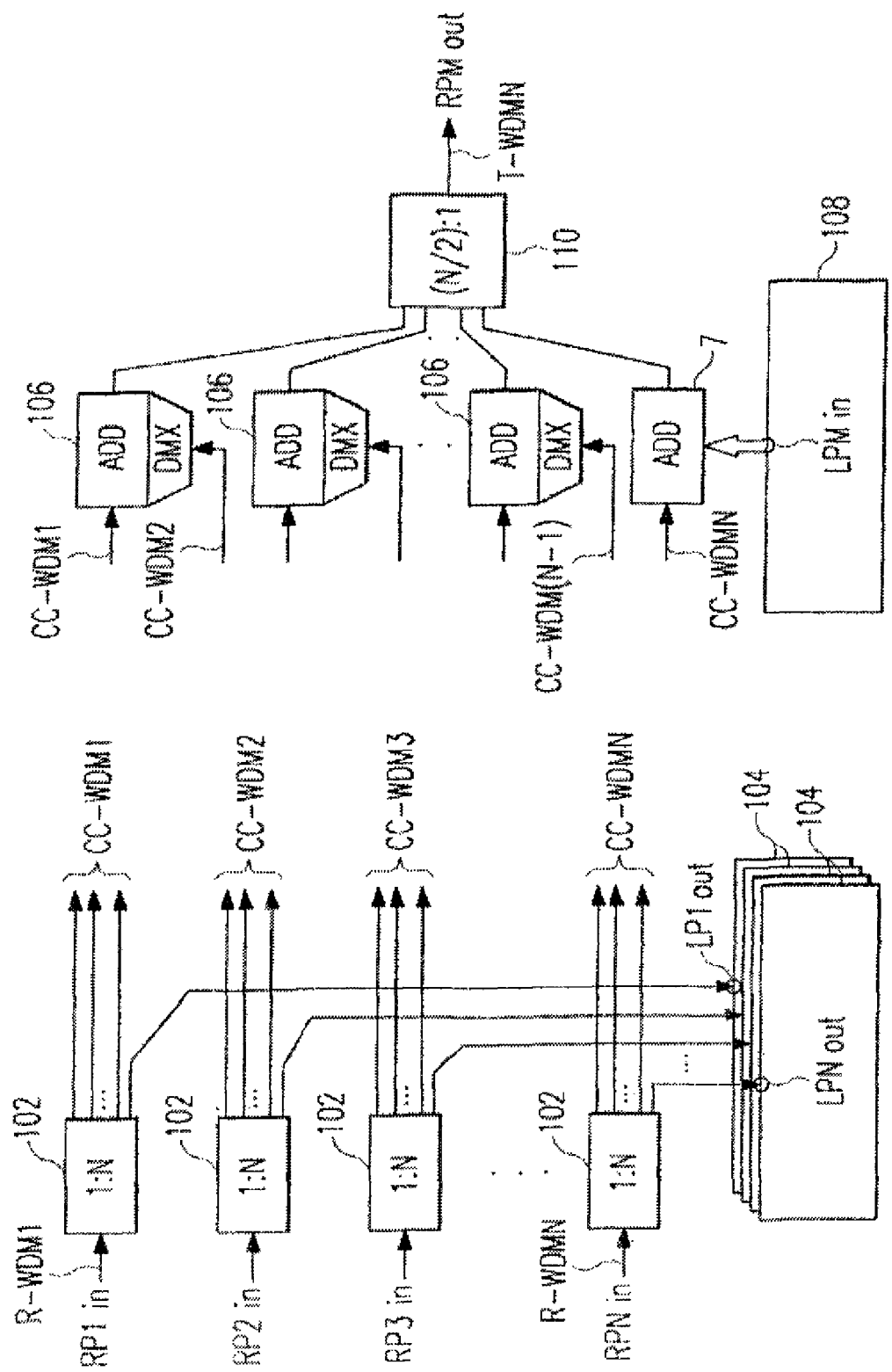
FIG. 4 is a schematic block diagram of a circuit structure according to the invention for realizing an N-order node for an even number N.

The circuit structure 100 shown in FIG. 4 for an even-numbered N-order node differs from the circuit structure shown in FIG. 3 for an odd-numbered N-order node only in that, on the output side of each remote port RP 1 to RPN, no individual cross-connect WDM signal must be processed by means of an add unit 7 or a partially unused add-demultiplexing unit 106 into a corresponding sub-transmit WDM signal. The number of input ports for the splitter unit 110 is given in this case by N/2 for an even-numbered N.

Below, various possibilities are described for how a circuit structure for realizing an already existing second-order node can be expanded in a simple way to one of the previously described circuit structures for a higher-order node.

Here, FIG. 5 shows a schematic block diagram of a circuit structure for realizing a second-order node. A base circuit structure 112, which is composed of an add unit 7 and a 1:2 splitter unit 3, is provided for each remote port RP1, RP2. In addition, the circuit structure shown in FIG. 5 has in each base circuit structure 112 a demultiplexing unit 5, to whose input port is fed the split signal generated at one of the output ports of the splitter unit 3. For realizing a 2nd-order node, each output port of the splitter units 3 is connected to the input port of the add unit of another base circuit structure 112.

Thus, a remote WDM signal R-WDM1 or R-WDM2 fed to the splitter unit 3 of a base circuit structure 112 is split by means of each splitter unit 3 into a cross-connect WDM signal CC-WDM1 or CC-WDM2, and a signal that is identical in terms of the information content and is fed to each input port of the relevant demultiplexing unit 5 of the corresponding base circuit structure 112 as a cross-connect WDM signal CC-WDM1 or CC-WDM2. For the circuit structure of a second-order node shown in FIG. 5, the demultiplexed individual channel signals can each be received, output, and fed to a module for further processing at the local port LP1 or LP2, more precisely, at the outputs of the local ports LP1out or LP2out. Simultaneously, the individual add channels to be added can be fed as individual signals of the respective add unit 7 to each base circuit structure 112 at the input of the respective local port LP1in or LP2in.

FIG. 6 now shows schematically a circuit structure for a third or fourth-order node, wherein only the components for realizing a single remote port, namely the remote port RP1, and for realizing the relevant local port, namely the local port LP1, are shown. Identical circuit structures are provided for the other ports, which, as described below, are connected to each other.

The circuit structure shown in FIG. 6 for realizing a single remote port and the associated local port is composed of a base circuit structure 112 already known from FIG. 5. In addition, an expansion circuit structure 114 is provided that is composed of an add-demultiplexing unit 106, wherein the output port of the add unit is connected to the input port of a 2:1 splitter unit 116. The expansion circuit structure 114 is also composed of a 1:3 splitter unit 118. In addition, as shown in FIG. 6, a through-connected optical waveguide 120 can be provided.

Thus, the two base circuit structures 112, which are provided for realizing a second-order node according to FIG. 5, can be used to expand the existing second-order node to a third or fourth-order node, wherein a circuit structure according to FIG. 6 is to be provided for each remote port of the third or fourth-order node to be realized.

For expanding an existing second-order node, another base circuit structure 112 must be added for each additional remote port (i.e., for each additional order, three or four). In addition, an expansion circuit structure 114 must be added for each of the three or four ports of the third or fourth-order node to be realized. Here, the relevant base circuit structure 112 and the relevant expansion circuit structure 114 according to FIG. 6 are to be connected for each remote port and for each associated local port.

Here, each output port of the through-connected optical waveguide 120 must be connected to the input port of the add unit 7 of the base circuit structure 112, and the output port of the 1:2 splitter unit 3 of the base circuit structure 112 must be connected to the input port of the 1:3 splitter unit 118 of the expansion circuit structure 114. In addition, the output port of the add unit 7 of the base circuit structure 112 must be connected to the free input port of the 2:1 splitter unit 116 of the expansion circuit structure 114.

The receive WDM signal R-WDM1 is fed to the circuit structure shown in FIG. 6 at the input of the 1:2 splitter unit 3 of the base circuit structure. This input port of the 1:2 splitter unit 3 thus forms the input port RP1in of the remote port RP1.

A cross-connect WDM signal, which is generated by the analogous circuit structures realizing each other port, is fed to the input port of the through-connected optical waveguide 120 and the two input ports of the add-demultiplexing unit 106 of the expansion circuit structure 114. Here, every two cross-connect WDM signals (in FIG. 6 the two signals CC-WDM3 and CC-WDM4) are combined into a sub-transmit WDM signal. Another sub-transmit WDM signal is generated by the combination of the third cross-connect WDM signal (in FIG. 6 the signal CC-WDM2) with the add channels of each local port by means of the add unit 7 of the base circuit structure 112. The sub-transmit WDM signal output at the output port of the add unit 7 of the base circuit structure 112 is fed to the input port of the 2:1 splitter unit 116 of the expansion circuit structure 114 and in this way combined with the sub-transmit WDM signal generated by means of the add-demultiplexing unit 106 into the transmit WDM signal T-WDM1 to T-WDM4 of the relevant remote port RP1 to RP4. The output port of the 2:1 splitter unit 116 of the expansion circuit structure 114 thus forms the output side RP1out to RP4out of the relevant remote port RP1 to RP4.

The output ports of the 1:3 splitter unit 118 of the circuit structure shown in FIG. 6 for realizing the remote port RP1 split the supplied signal, which is identical to the receive WDM signal R-WDM1, in order to generate in this way at the output port of the splitter unit 118 a cross-connect WDM signal CC-WDM1, which is fed to each of the other circuit structures for realizing the other remote ports RP2 to RP4. The cross-connect WDM signals CC-WDM2 to CC-WDM4 fed to the structure shown in FIG. 6 for realizing the remote port RP1 and the local port LP1 are generated in an analogous way from the corresponding circuit structures for realizing the other remote ports RP2 to RP4 and the local ports LP2 to LP4.

Thus, by adding corresponding base circuit structures 112 or expansion circuit structures 114, a third or fourth-order node can be generated easily using already existing base circuit structures 112 for realizing a second-order node.

For the expansion circuit structure shown in FIG. 6, obviously one of the input ports of the add-demultiplexing unit 106 or the input port of the add unit 7 of the base circuit structure 112 remains unused if only a third-order node is to be realized.

In order to allow a simple, modular expansion of a second-order node to a higher-order node, the base circuit structures 112 and the expansion circuit structures 114 can obviously be constructed as separate modules. This possibility is indicated in FIGS. 4 to 10 by the solid lines and the respective components.

Obviously, the through-connected optical waveguide 120 of the expansion circuit structure 114 can also be eliminated. In this case, the relevant cross-connect WDM signal (in FIG. 6 the signal CC-WDM2) must be fed directly to the input port of the add unit 7 of the base circuit structure 112. The solution shown in FIG. 6 for the expansion circuit structure 114, however, has the advantage that all of the ports for feeding the cross-connect WDM signals can be constructed from the other ports on a single module.

Figure 7:
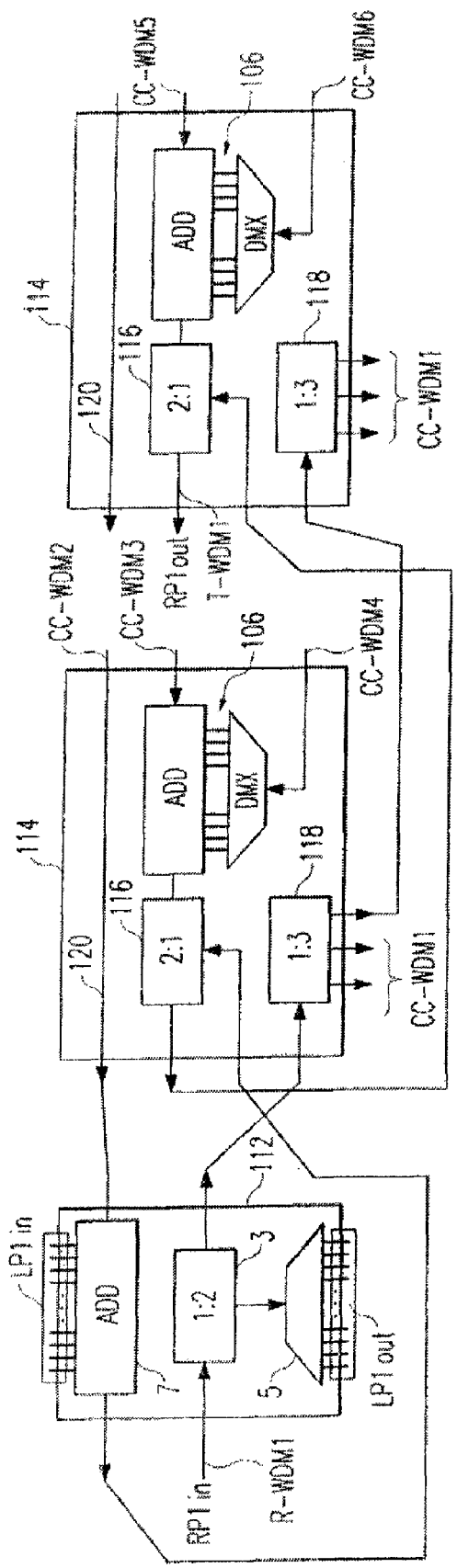
FIG. 7 is a schematic block diagram of a circuit structure according to the invention for realizing a fifth or sixth-order node, with only the components for one of the five or six remote ports being shown.

In FIG. 7, a circuit structure for realizing a remote port, namely the remote port RP1, and the associated local port, namely the local port LP1, for realizing a fifth or sixth-order node is shown. For the other remote ports RP2 to RP6 or for the other local ports LP2 to LP6, identical structures are again to be provided that are connected in the way explained below.

In an identical way, the circuit structure shown in FIG. 7 is composed of the circuit structure according to FIG. 6 for realizing a third or fourth-order node. In addition, another expansion circuit structure 114 is added for realizing each remote port RP1 to RP5.

Thus, if a second-order node is to be expanded to a fifth or sixth-order node, then for each additional port a base circuit structure 112 is initially to be provided. In addition, two additional expansion circuit structures 114 must be provided for each remote port.

The base circuit structure 112 and the first expansion circuit structure 114 are here to be connected in identical fashion to the structure in FIG. 6.

In addition, the output port of the 2:1 splitter unit 116 of the first expansion circuit structure 114 is connected to the input port of the 2:1 splitter unit 116 of the second expansion circuit structure 114. In addition, an output port of the 1:3 splitter unit 118 of the first expansion circuit structure 114 is connected to the input port of the 1:3 splitter unit 118 of the second expansion circuit structure 114.

Thus, with this circuit structure a maximum of five cross-connect WDM signals can be combined into a single transmit WDM signal T-WDM1, which is output at the output port of the 2:1 splitter unit 116 of the second expansion circuit structure 114. The sub-transmit WDM signal that is output at the output of the 2:1 splitter unit 116 of the first expansion circuit structure 114 is fed to the input port of the 2:1 splitter unit 116 of the second expansion circuit structure 114, and in this way is combined with the sub-transmit WDM signal that is generated by the add-demultiplexing unit 106 of the second expansion circuit structure 114 and is fed to the input port of the 2:1 splitter unit 116 of the second expansion circuit structure 114, into the transmit WDM signal T-WDM1 output at remote port RP1.

Because it is otherwise no longer possible for the circuit structure shown in FIG. 7 to provide all of the input ports for the cross-connect WDM signals CC-WDM2 to CC-WDM6 on a single module, when the expansion circuit structures 114 are each constructed as separate modules the provision of a through-connected optical waveguide 120 can also be eliminated. As already explained above, the relevant cross-connect WDM signal (in FIG. 7 the signal CC-WDM2) must be fed directly to the input port of the add unit 7 of the base circuit structure 112.

From FIGS. 6 and 7 and the previous explanations, it has become clear that the circuit structure shown in FIG. 7 for generating nodes that each feature an order higher by two, must be expanded merely by one additional expansion circuit structure 114. Here, only the output port of the 2:1 splitter unit 116 of the last, already existing expansion circuit structure 114 is connected to the input port of the 2:1 splitter unit 116 of the subsequent expansion circuit structure 114. In addition, an output port of the 1:3 splitter unit 118 of the last, already existing expansion circuit structure 114 must be connected to the output port of the 1:3 splitter unit 118 of the subsequent expansion circuit structure 114. Circuit structures expanded in this way are to be provided for each of the remote ports RP1 to RP2N, with N being a natural whole number. For realizing an N-order node with an odd-numbered N, only the components for realizing one remote port must be eliminated. At the same time, an input port to which a cross-connect WDM signal can be fed remains free on any of the expansion circuit structures 114 or the base circuit structure 112.

Figure 8:
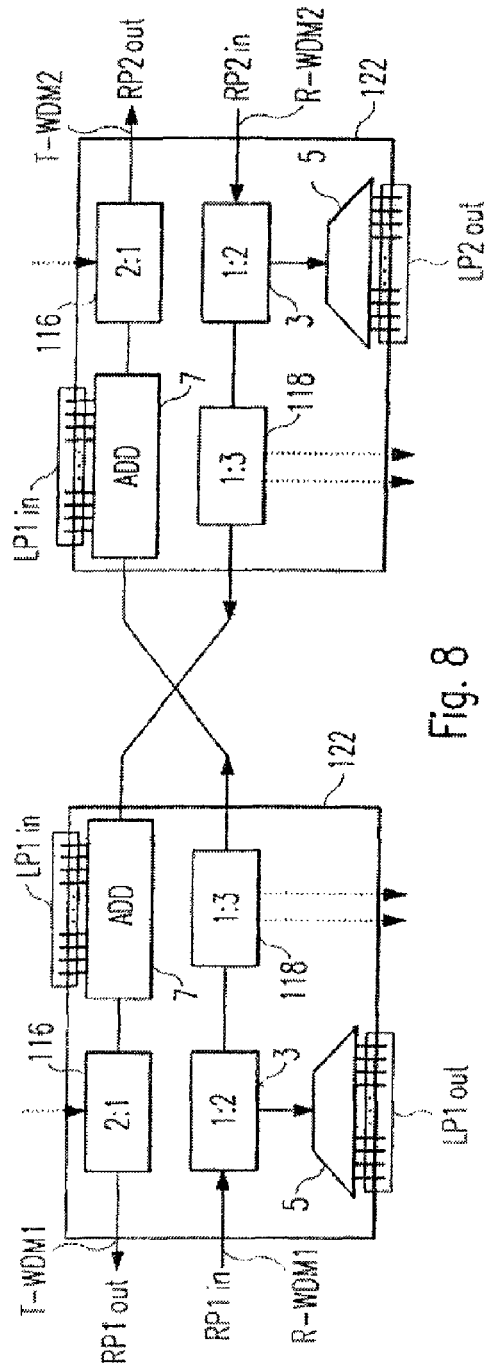
FIG. 8 is a schematic block diagram of a circuit structure according to the invention for realizing an uninterruptible and expandable second-order node.

FIG. 8 shows a circuit structure for realizing a second-order node, wherein the second-order node realized in this way is formed so that it can be expanded in an uninterruptible way to a higher-order node. The circuit structure shown here in FIG. 8 is composed of two identical base circuit structures 122, which just like the base circuit structure 112 shown in FIG. 5 are composed of an add unit 107 and a 1:2 splitter unit 3, wherein one output port of the splitter unit 3 is connected to the input port of a demultiplexing unit 5. The output ports LP1out and LP2out of the local ports LP1 and LP2 are thus realized in the same way as for the base circuit structures 112 according to FIG. 5.

In addition, the base circuit structure 122 shown in FIG. 8 has a 2:1 splitter unit 116 whose one input port is connected to the output port of the add unit 7. The second input port of the 2:1 splitter unit 116 remains unused for realizing a second-order node, and can be terminated in a defined way if necessary.

In addition, the base circuit structure 122 has a 1:3 splitter unit 118 whose input port is connected to one of the output ports of the 1:2 splitter unit 3. As shown in FIG. 8, two of the output ports of the 1:3 splitter unit remain unused for realizing a second-order node.

With the base circuit structures 122 shown in FIG. 8, which can in turn be constructed as separate modules or can be components of separate modules, a second-order node can be realized such that the output ports of the 1:3 splitter units 118 are each connected to the input port of the add unit 7 of the respective other base circuit structure 122. The transmit WDM signals T-WDM1 and T-WDM2 are here output at the output port of the 2:1 splitter units 116, which each form the output RP1out or RP2out of the remote ports RP1 or RP2. The input sides RP1in and RP2in of the remote ports RP1 and RP2 are formed by the input ports of the 1:2 splitter units 3, to each of which is fed the remote WDM signal R-WDM1 or R-WDM2.

Figure 9:
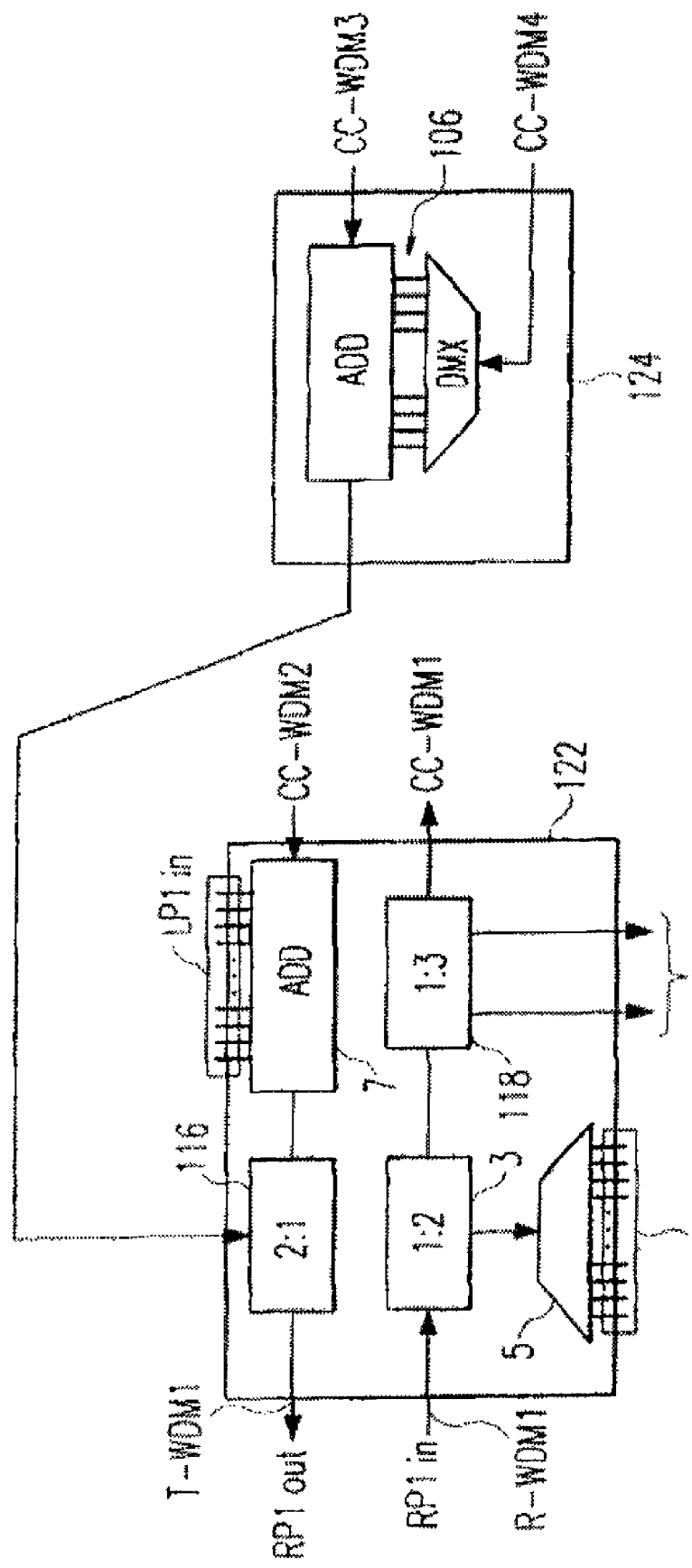
FIG. 9 is a schematic block diagram of a circuit structure according to the invention for realizing a third or fourth-order node by expanding the circuit structure of a node of second order according to FIG. 8, with only the components for one of the three or four remote ports being shown.

The circuit structure shown in FIG. 8 for a second-order node can be expanded in an uninterruptible way to a third or fourth-order node, as shown in FIG. 9. Here, another base circuit structure 122 is initially provided for each additional port. In addition, an expansion circuit structure 124 is added for each of the three or four ports that can include merely one add-demultiplexing unit 106. The expansion circuit structure 124 can be constructed as separate modules, just like the base circuit structure 122. Here, FIG. 9 shows the circuit structure of a node expanded to a third or fourth order for only a single port. For every other port, identical circuit structures are provided that are then connected in the way described below. The expansion can be performed without at times breaking up, i.e., interrupting, the structure for a second-order node shown in FIG. 8.

In addition, the output port of the add-demultiplexing unit 106 of each expansion circuit structure 124 is to be connected to the free input port of the 2:1 splitter unit of the associated base circuit structure 122. Finally, the cross-connect WDM signals generated by means of the 1:3 splitter units 118 from each circuit structure according to FIG. 9 realizing a remote port are connected to the associated output ports of each of the circuit structures according to FIG. 9 realizing the other remote ports (and obviously also associated local ports). Here, the two input ports of the add-demultiplexing unit 106 of the expansion circuit structure 124 and the input port of the add unit 7 of the base structure 122 are involved. To allow a continuous expansion, obviously the already assigned input ports of the add units 7 of the two base circuit structures 122 that have realized the second-order nodes may not be disconnected. However, because the previously described input ports of the add unit 7 and the add-demultiplexing unit 106 of a circuit structure according to FIG. 9 are to have equal access to each other, each free input port of the expansion circuit structure 124 or the add-demultiplexing unit 106 can be used.

The necessary cross-connect WDM signals CC-WDM1 to CC-WDM4 are here each generated by the 1:3 splitter units 118 of the base circuit structure 122 of each identical circuit structure according to FIG. 9 realizing a remote port or local port.

Figure 10:
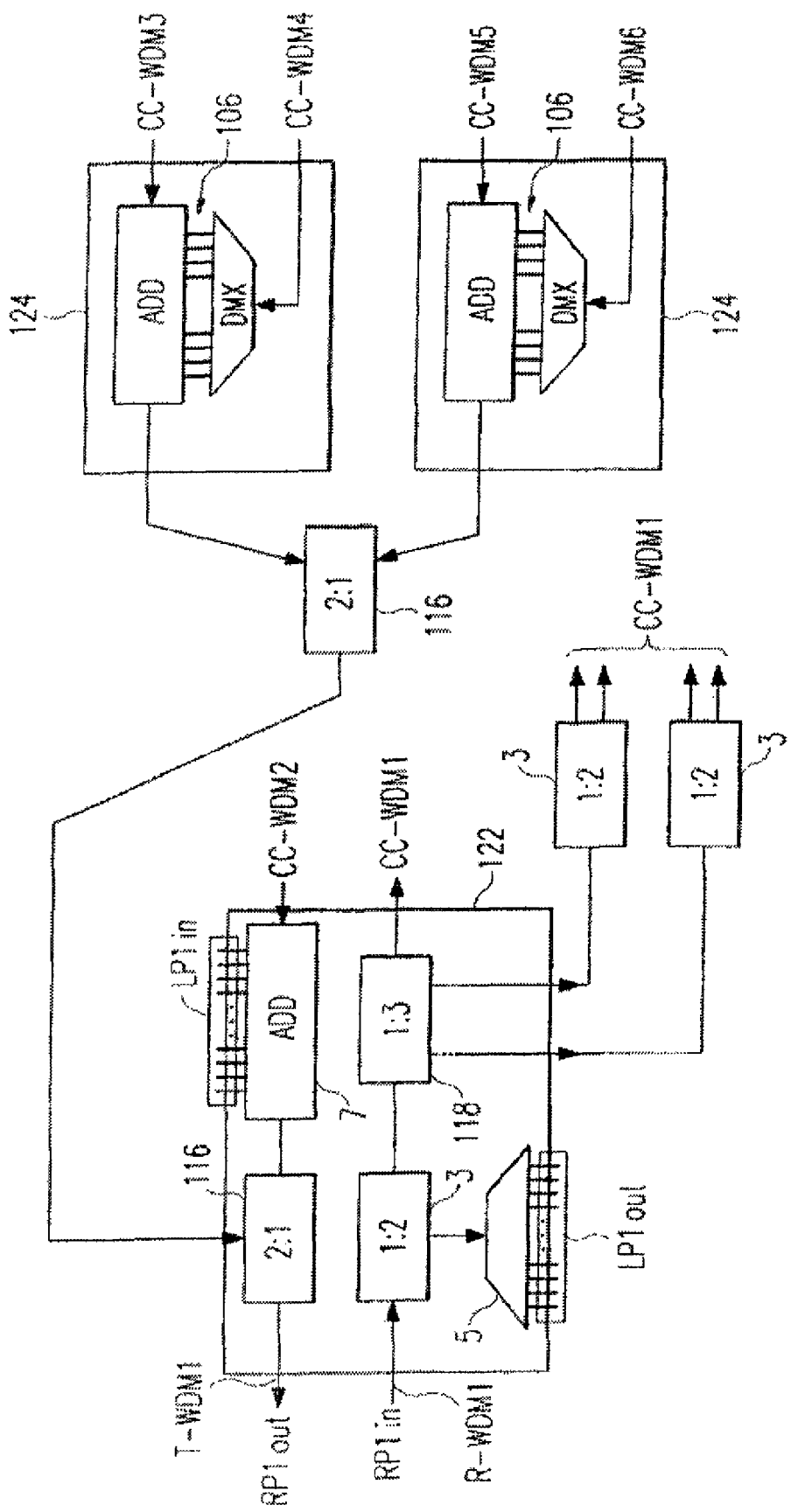
FIG. 10 is a schematic block diagram of a circuit structure according to the invention for realizing a fifth or sixth-order node by expanding the circuit structure of a second-order node according to FIG. 8, with only the components for one of the five or six remote ports being shown.

FIG. 10 shows a circuit structure for realizing a fifth or sixth-order node, wherein this node can be realized by the continuous expansion of a second-order node according to FIG. 8.

For such expansion, an additional base circuit structure 122 is initially to be provided for each additional remote port, i.e., for each additional order greater than two. Each circuit realizing a remote port or an associated local port for the expanded fifth or sixth-order node is produced, as shown in FIG. 10, by adding two expansion circuit structures 124, as well as by adding two 1:2 splitter units 3 and adding one 2:1 splitter 116, which are to be connected according to the representation in FIG. 10. Here the output ports of the add-demultiplexing units 106 of the added expansion circuits 124 are connected to the input ports of the 2:1 splitter unit 116. The output port of the 2:1 splitter unit 116 is connected to the free input port of the 2:1 splitter unit 116 of the associated base circuit structure 122. Finally, two of the three output ports of the 1:3 splitter units 118 of the base circuit structures 122 are connected to the input ports of the added 1:2 splitter units 3. In the case of base circuit structures 122 that realize the already existing second-order nodes to be expanded, obviously the two free output ports of the 1:3 splitter units 118 of the base circuit structures 122 are to be used in order to allow continuous expansion.

The cross-connect WDM signals CC-WDM1 to CC-WDM6 are generated at the output ports of the added 1:2 splitter units 3 and the other output port of the 1:3 splitter unit 118 of each base circuit structure 122. These cross-connect WDM signals are to be connected to the equal-access input ports of the add-demultiplexing units 106 of the expansion circuit structures 124 and to the input port of the add unit 7 of the base circuit structure 122 of the circuit structures for realizing each other remote port according to FIG. 10. Accordingly, for the circuit structure shown in FIG. 10 that realizes the remote port RP1, the cross-connect WDM signal CC-WDM2 is fed to the input port of the add unit 7 of the base circuit structure 122 and the cross-connect WDM signals CC-WDM3 to CC-WDM6 are fed to the input ports of the add-demultiplexing units 106 of the two additional expansion circuit structures 124. The signal CC-WDM2 was already connected in the circuit structure to be expanded for the second-order node to the input port of the add unit 7 of the base circuit structure 122, and may not be assigned in another way for realizing a continuous expansion. The corresponding situation applies to the analogous circuit structure that realizes the remote port RP2. In this case, the signal CC-WDM1 of the relevant add unit 7 of the base circuit structure 122 is connected, and may not be detached for expansion.

Obviously, in the structure shown in FIG. 10 a single 1:4 splitter unit can also be used instead of two 1:2 splitter units. In this case, however, the optical losses are greater if a 1:3 splitter unit 118 is used within the base circuit structure 122 as before. A continuous expansion, however, can be realized with any 1:n splitter unit with n greater than or equal to two, because in this case the already existing structure for realizing a second-order node need not be modified.

In addition, instead of a 2:1 splitter unit 116 for the base circuit structure 122, an m:1 splitter unit with m greater than or equal to 2 can also be used. For example, the 2:1 splitter unit 116 added separately in FIG. 10 can be integrated into the base circuit structure 122 if a 3:1 splitter unit is used instead of the 2:1 splitter unit 116.

In an analogous way, nodes each with an order higher than two can be realized if an additional expansion circuit structure 124 is added to the structure shown in FIG. 10 and two additional, complete circuit structures according to FIG. 10 are provided for realizing the two additional ports. The sub-transmit WDM signals generated by the add-demultiplexing units 106 can then be combined by a splitter unit with a suitable number of input ports and fed via the output port of this splitter unit to the input port of the 2:1 splitter unit 116 of the base circuit structure 122. Obviously, a cascade-like splitter unit composed of several splitter units with a suitable number of input ports can also be used instead of a single splitter unit for combining the sub-transmit WDM signals.

The above described exemplary embodiments are intended to illustrate the principles of the invention, but not to limit the scope of the invention. Various other embodiments and modifications to these example embodiments may be made by those skilled in the art without departing from the scope of the present invention.

The invention claimed is:

1. An optical circuit structure for realizing a higher-order node in an optical transmission network comprising:
    (a) a number N of bidirectional remote ports, each remote port operable to receive a respective one of a number N of optical receive wavelength division multiplexed signals (R-WDM signals) each having a set of optical receive channels, each remote port operable to output a respective optical transmit wavelength division multiplexed signal (T-WDM signal) having a set of optical transmit channels, wherein a respective optical center wavelength is assigned to each receive channel or transmit channel, and wherein the number N is greater than or equal to three;
    (b) a number M of bidirectional local ports, M being greater than or equal to one and less than or equal to N, each of the M local ports being associated with a respective selected one of the N remote ports, each local port being operable to receive one or more optical add channels and output one or more optical drop channels;
    (c) one or more optical drop channel circuits for feeding selected optical channels of respective ones of the N R-WDM signals as drop channels to respective selected ones of the M local ports, and for guiding the respective R-WDM signals as cross-connect wavelength division multiplexed signals (cross-connect WDM signals) toward the relevant remote port, each drop channel circuit including an optical splitter unit splitting the respective R-WDM signal and an optical demultiplexing unit connected to an output port of the optical splitter unit;
    (d) a number N of optical add and cross-connect circuits for guiding the respective R-WDM signals as cross-connect wavelength division multiplexed signals (cross-connect WDM signals) toward the relevant remote port, and for generating a respective one of the optical T-WDM signals for each of the N remote ports, each optical acid and cross-connect circuit for extracting certain receive channels as pass-through channels from the R-WDM signals of one or more of the other remote ports and combining together with the selected ones of the one or more add channels optionally added to the respective T-WDM signal that can be output from the relevant remote port, each add and cross connect circuit comprising:
        (1) an optical add circuit for receiving selected ones of the cross-connect WDM signals and generating two or more sub-transmit wavelength division multiplexed signals (sub-transmit WDM signals) for the relevant remote port, the optical add circuit comprising two or more of the following:
            (i) one or more first optical add demultiplexing units each including a first demultiplexing unit, a number of channel input ports, a number of optical 2×1 switches according to the number of channels of a corresponding WDM signal, and a multiplexing unit, each of the first optical add demultiplexing units for combining respective pairs of the cross-connect WDM signals into a respective sub-transmit WDM signal, a first one of the pair of cross-connect WDM signals being connected to an input of the first demultiplexing unit, wherein channel output ports of the first demultiplexing unit are each connected to respective first input ports of the optical 2×1 switches, a second one of the pair of cross-connect WDM signals being connected to an input of a second demultiplexing unit connected to the first optical add demultiplexing unit and having channel output ports connected to the channel input ports of the optical add demultiplexing unit, channel output ports of the second demultiplexing unit being connected to second input ports of the optical 2×1 switches, the output ports of the 2×1 switches connected to inputs ports of the multiplexing unit, the output of the multiplexing unit for providing a respective one of the sub-transmit WDM signals;
            (ii) a single second optical add demultiplexing unit including a first demultiplexing unit, a number of channel input ports, a number of optical 2×1 switches according to the number of corresponding WDM signal, and a multiplexing unit, for combining a cross-connect WDM signal and an optionally existing add channels into another respective one sub-transmit WDM signal;
            (iii) if the number of cross-connect WDM signals is even, the optical add circuit further includes a single third optical add demultiplexing unit including a first demultiplexing unit, a number of channel input ports, a number of optical 2×1 switches according to the number of corresponding WDM signal, and a multiplexing unit, for converting a selected remaining cross-connect WDM signal converted into another respective one sub-transmit WDM signal; and
        (2) an optical splitter unit associated with the relevant remote port, the optical splitter units for combining the two or more sub-transmit wavelength division multiplexed signals into the T-WDM signal that can be output from the relevant remote port.

2. The optical circuit structure of claim 1, characterized in that the optical add demultiplexing units each have an identical structure, wherein the number and spectral position of the channels of the demultiplexing units included in the add demultiplexing units are identical.

3. The optical circuit structure of claim 1, wherein the optical add and cross connect circuit of at least one remote port is for generating the respective T-WDM signal using all cross-connect WDM signals of the other remote ports.

4. The optical circuit structure of claim 1, wherein the one or more optical drop channel circuits is for generating the N−1 cross-connect WDM signals by means of N optical 1:(N−1) splitter units, to each of which is connected the receive wavelength division multiplexed signal of a remote port.

5. The optical circuit structure of claim 1, further comprising N optical 1:N splitter units, to each of which is connected the R-WDM signal of a respective remote port, the N optical 1:N splitter units for generating the N cross-connect wavelength division multiplexed signals.

6. The optical circuit structure of claim 1, wherein the number M of local ports is equal to the number N of remote ports.

7. The optical circuit structure of claim 1, wherein a wavelength division demultiplexing unit is adapted to demultiplex the receive wavelength division multiplexed signal of the associated remote port connected to a local port into the individual drop channels.

8. The optical circuit structure of claim 1, wherein the optical splitter unit for combining the sub-transmit wavelength division multiplexed signals is constructed in a cascade-like fashion from several optical splitter units.

9. The circuit structure of claim 1, wherein the optical drop channel circuits and the optical add and cross-connect circuits consist essentially of optical splitter units, optical demultiplexing units, optical add units, and optical interconnections therebetween.

10. An optical expansion circuit for expanding a first optical circuit, the first optical circuit for realizing a second order or higher node, the expansion circuit to realize a higher order node than the first optical circuit, wherein:
the first optical circuit structure includes, for each of the two remote ports, an optical base circuit comprising:
(a) a 1:2 splitter unit for generating respective drop channels and a cross-connect wavelength division multiplexed signal from the receive wavelength division multiplexed signal of the relevant remote port for the respective other remote port, as well as an add unit to which are fed the add channels for the relevant remote port and the cross-connect wavelength division multiplexed signal and which generates therefrom the transmit wavelength division multiplexed signal for the relevant remote port;
and wherein the optical expansion circuit comprises:
(b) a combination of an optical add unit and a multiplexing unit, the optical add unit including an optical wavelength division demultiplexing unit connected to an input port for a wavelength division multiplexed signal and a wavelength division multiplexing unit connected to an output port for a wavelength division multiplexed signal, wherein a channel output port of the wavelength division demultiplexing unit connects individual output channels to a first input port of a corresponding numbers of optical 2×1 switches, wherein an individual additional channel can be fed to a second input port of each of the optical 2×1 switches, so that by means of each of the optical 2×1 switches, either the relevant demultiplexed channel or the relevant additional channel can be fed via the output port of the 2×1 switches to the relevant channel input port of the wavelength division multiplexing unit, wherein a correspondingly combined wavelength division multiplexed signal is generated at the output port, the multiplexing unit for generating a respective transmit wavelength division multiplexed signal or a sub-transmit wavelength division multiplexed signal, wherein a first additional cross-connect wavelength division multiplexed signals is fed to the input port of the add unit and a second additional cross-connect wavelength division multiplexed signals is fed to the input of the demultiplexing unit, and wherein the channels generated on the output side by the demultiplexing unit are each fed to a second input port of a respective 2×1 switch;
(c) an optical 2:1 splitter unit, wherein one input port of the 2:1 splitter unit is connected to the output port of the add unit; and
(d) an optical 1:3 splitter unit, wherein an input port of the 1:3 splitter unit is connected to one output port of the 2:1 splitter unit.

11. An optical circuit structure for a third or fourth-order node using optical expansion circuits according to claim 10, wherein:
(a) an optical base circuit and an optical expansion circuit according to claim 10 are provided for each of the three or four remote ports;
(b) for generating the transmit wavelength division multiplexed signal for each remote port
(1) a first cross-connect wavelength division multiplexed signal and optionally the add channels of the relevant local port are connected to the add unit of the base circuit;
(2) a second cross-connect wavelength division multiplexed signal is connected to the input port of the add unit or to the input port of the demultiplexing unit of the expansion circuit;
(3) in the case of realizing a fourth-order node, a third cross-connect wavelength division multiplexed signal is connected to the input port of the demultiplexing unit of the expansion circuit or to the input port of the add unit of the expansion circuit;
(4) the output port of the add unit of the base circuit is connected to an input port of the 2:1 splitter unit of the expansion circuit;
(5) wherein the transmit wavelength division multiplexed signal for the relevant remote port is generated at the output port of the 2:1 splitter unit;
(c) the output port of the 1:2 splitter unit of the base circuit is connected to the input port of the 1:3 splitter unit of the expansion circuit; and
(d) the cross-connect wavelength division multiplexed signal generated at the output ports of the 1:3 splitter unit of the expansion circuit is provided as an input cross-connect wavelength division multiplex signal to the base circuits or expansion circuits of each other remote port.

12. An optical circuit structure for a fifth or sixth-order node using optical expansion circuits according to claim 10, comprising:
(a) means for realizing a fourth-order node by creating one or two first additional remote ports added to the circuit structure of claim 10;
(b) means for realizing one or two second additional ports, each including a base circuit and one expansion circuit for each second additional remote port provided according to claim 10, wherein the structure for each second additional remote port includes a means for realizing a fourth order node added to the circuit structure of claim 10;
(c) a second expansion circuit for each remote port, wherein, for generating a transmit wavelength division multiplexed signal for each remote port on an output port of a 2:1 splitter unit of the second expansion circuit,
(1) an output port of a 2:1 splitter unit of the first expansion circuit is connected to an input port of the 2:1 splitter unit of the second expansion circuit and accordingly a transmit wavelength division multiplexed signal of the means for realizing a fourth order node used as a sub-transmit wavelength division multiplexed signal;
(2) a fourth cross-connect wavelength division multiplexed signal is fed to an input port of an add unit or to an input port of a demultiplexing unit of the second expansion circuit, and (3) in the case of realizing a sixth-order node, a fifth cross-connect wavelength division multiplexed signal is fed to an input port of the demultiplexing unit or to an input port of an add unit of the second expansion circuit, and
(d) an output port of the 1:3 splitter unit of the first expansion circuit is connected to an input port of a 1:3 splitter unit of the second expansion circuit; and
(e) cross-connect wavelength division multiplexed signals generated at the other two output ports of the 1:3 splitter unit of the first expansion circuit and three output ports of the 1:3 splitter unit of the second expansion circuit are provided as cross connect wavelength division multiplexed signals to the base circuits or expansion circuits of the other remote ports.

13. An optical circuit structure for a node of the order six plus 2n, wherein n is a whole natural number, using optical expansion circuits according to claim 10, comprising:
    (a) a means for providing a sixth order node using optical expansion circuits according to claim 10 is expanded by one base circuit and two expansion circuits for each additional order for creating the additional remote ports, wherein the structure for each remote port corresponds to the means for providing a sixth order node; and
    (b) wherein the structure expanded in this way is expanded by a number n of expansion circuits for each remote port, wherein for each remote port two successive expansion circuits are connected, and wherein the transmit wavelength division multiplexed signal is generated for each remote port at the output port of a 2:1 splitter unit of a selected final expansion circuit.

14. An expanded optical circuit structure for realizing a third or fourth-order node with three or more remote ports, comprising:
    (a) a base circuit structure provided for each remote port, including:
        (i) an optical add demultiplexing unit including a first demultiplexing unit, a number of channel input ports, a number of optical 2×1 switches according to the number of corresponding WDM signal, and a multiplexing unit, having an output port connected to a first input port of a 2:1 splitter unit, wherein a second input port of the 2:1 splitter unit remains unused in the case of realizing a second-order node and wherein a transmit wavelength division multiplexed signal of a relevant port is generated at an output port of the 2:1 splitter unit from add channels optionally fed to the add unit and a cross-connect wavelength division multiplexed signal fed to the input port of the add unit;
        (ii) a 1:2 splitter unit, to which is fed a receive WDM signal of the relevant remote port, wherein drop channels are output at an output port of the 1:2 splitter unit; and
        (iii) with a 1:m splitter unit having an input port connected to the other output port of the 1:2 splitter unit, wherein m is a natural number greater than or equal to two, and wherein a cross-connect wavelength division multiplexed signal for feeding to other remote ports is generated at the output ports of the 1:m splitter unit
    wherein a cross-connect wavelength division multiplexed signal generated at an output of the 1:m splitter unit of one of the other base circuit structures is fed to each add unit of an added base circuit structure: and
    (b) for each remote port an expansion circuit structure is provided composed of an additional add unit that is combined with a demultiplexing unit, where demultiplexing output ports of the demultiplexing unit are connected to the input ports of the 2×1 switches of the add unit, an output port of the add unit being connected to a free input port of the 2:1 splitter unit of the base circuit structure; and
    (c) wherein for each remote port a second or third cross-connect wavelength division multiplexed signal is fed from one of the output ports of the 1:m splitter units of the base circuit structures of the other remote ports to the input port of the add unit and/or the input port of the demultiplexing unit of the expansion circuit structure.

15. An expanded optical circuit structure realizing a node of order N greater than or equal to 5, using the structure of claim 14, wherein:
    (a) for each additional remote port, an additional base circuit structure is added wherein the cross-connect wavelength division multiplexed signal generated at an output of the 1:m splitter unit of one of the other base circuit structures is fed to each add unit of an added base circuit structure; and
    (b) for each pair of additional remote ports, to each additional remote port, an expansion circuit structure is added composed of an additional add unit which is combined with a demultiplexing unit such that the demultiplexing output ports of the demultiplexing unit are connected to the input ports of the 2×1 switches of the add unit to which the free input port of the 2:1 splitter unit is connected; and
    (c) for each of the remote ports an n:1 splitter unit is added, wherein the number n designates the number of started pairs of added remote ports;
    (d) for each remote port, all of the output ports of the add units of the added expansion circuit structures are connected to the input ports of the 1:n splitter unit;
    (e) for each remote port, the output port of the 1:n splitter unit is fed to the input port of the 2:1 splitter unit of the base circuit structure;
    (f) for each remote port, one of the cross-connect wavelength division multiplexed signals of the other remote ports is fed to the input ports of the add units and the demultiplexing units; and
    (g) for each remote port for generating the cross-connect wavelength division multiplexed signal for the other remote ports, the 1:m splitter unit of the relevant base circuit structure is expanded if necessary to a 1:(N−1) splitter unit.

* * * * *

UNITED STATES PATENT AND TRADEMARK OFFICE
CERTIFICATE OF CORRECTION

PATENT NO. : 7,835,645 B2  
APPLICATION NO. : 11/676992  
DATED : November 16, 2010  
INVENTOR(S) : Michael Eiselt Page 1 of 1

It is certified that error appears in the above-identified patent and that said Letters Patent is hereby corrected as shown below:

At column 2, line 36: change "and RP2 in," to read --and RP2in,--.

At column 15, line 51: change "each optical acid" to read --each optical add--.

Signed and Sealed this
First Day of February, 2011

David J. Kappos  
*Director of the United States Patent and Trademark Office*